United States Patent
Ozturk et al.

(10) Patent No.: US 11,723,761 B2
(45) Date of Patent: Aug. 15, 2023

(54) DENTAL STORAGE BOX

(71) Applicant: Istanbul Universitesi Rektorlugu, Istanbul (TR)

(72) Inventors: Oguz Ozturk, Istanbul (TR); Elif Bahar Tuna, Istanbul (TR); Fatih Seyhan, Istanbul (TR)

(73) Assignee: Istanbul Universitesi Rektorlugu, Istanbul (TR)

( * ) Notice: Subject to any disclaimer, the term of this patent is extended or adjusted under 35 U.S.C. 154(b) by 1079 days.

(21) Appl. No.: 16/474,658

(22) PCT Filed: Jul. 4, 2017

(86) PCT No.: PCT/TR2017/050305
§ 371 (c)(1),
(2) Date: Jun. 28, 2019

(87) PCT Pub. No.: WO2018/125009
PCT Pub. Date: Jul. 5, 2018

(65) Prior Publication Data
US 2020/0000567 A1    Jan. 2, 2020

(30) Foreign Application Priority Data
Dec. 29, 2016   (TR) ................................. 2016/20077

(51) Int. Cl.
*A61C 19/00*   (2006.01)
*A61C 17/00*   (2006.01)
(Continued)

(52) U.S. Cl.
CPC ............ *A61C 19/008* (2013.01); *A61C 17/00* (2013.01); *B65D 77/048* (2013.01); *B65D 77/08* (2013.01); *B65D 2577/043* (2013.01)

(58) Field of Classification Search
CPC ......... A61C 19/008; A61C 17/00; B08B 3/04; B08B 3/02
(Continued)

(56) References Cited

U.S. PATENT DOCUMENTS 4,054,220 A    10/1977  Rosenstein
4,377,077 A *  3/1983   Granlund .................. F25D 9/00
                                                435/307.1

(Continued)

FOREIGN PATENT DOCUMENTS

CN     202801852 U     3/2013
CN     203306325 U    11/2013
(Continued)

OTHER PUBLICATIONS

Foreign communication from a related counterpart application—International Search Report and Written Opinion, PCT/TR2017/050305, dated Nov. 3, 2017, 10 pages.

*Primary Examiner* — Anthony D Stashick
*Assistant Examiner* — Raven Collins
(74) *Attorney, Agent, or Firm* — Conley Rose P.C.; Rodney B. Carroll

(57) ABSTRACT

The present invention is a dental storage box (1) comprising a 3-dimensional hollow body (10) whose at least one surface is open and at least one outer cover (13) which closes the open surface of said body (10) in a manner providing sealing, in order to preserve a tooth, removed from the place thereof as a result of a trauma, for at least partially increasing the vitality duration of the tooth thanks to a protective liquid (30) provided therein. Accordingly, the subject matter dental storage box (1) is characterized by comprising at least one separator (15) provided inside the body (10) and which separates the protective liquid (30) and at least one cleaning liquid (40) in a manner providing sealing.

1 Claim, 2 Drawing Sheets

(51) Int. Cl.
  *B65D 77/04* (2006.01)
  *B65D 77/08* (2006.01)
(58) Field of Classification Search
  USPC ......... 206/63.5, 207; 435/284; 134/135, 111, 134/199
  See application file for complete search history.

(56) References Cited

U.S. PATENT DOCUMENTS

| | | | |
|---|---|---|---|
| 4,689,014 | A | 8/1987 | Krasner |
| 5,402,810 | A * | 4/1995 | Donley ................... B08B 3/044 |
| | | | 134/200 |
| 7,207,342 | B1 * | 4/2007 | Daniels ..................... B08B 3/02 |
| | | | 134/135 |
| 8,033,392 | B1 * | 10/2011 | Gehner ..................... A61L 2/26 |
| | | | 206/83 |
| 2007/0134624 | A1 | 6/2007 | Krasner |
| 2011/0036746 | A1 | 2/2011 | Bear |
| 2015/0021211 | A1 * | 1/2015 | Chastain ............ A63B 71/0036 |
| | | | 206/63.5 |

FOREIGN PATENT DOCUMENTS

| | | | |
|---|---|---|---|
| FR | 2711912 | A3 | 11/1993 |
| TR | 201620077 | | 12/2016 |
| WO | 2007070883 | A2 | 6/2007 |
| WO | 2018125009 | A1 | 7/2018 |

* cited by examiner

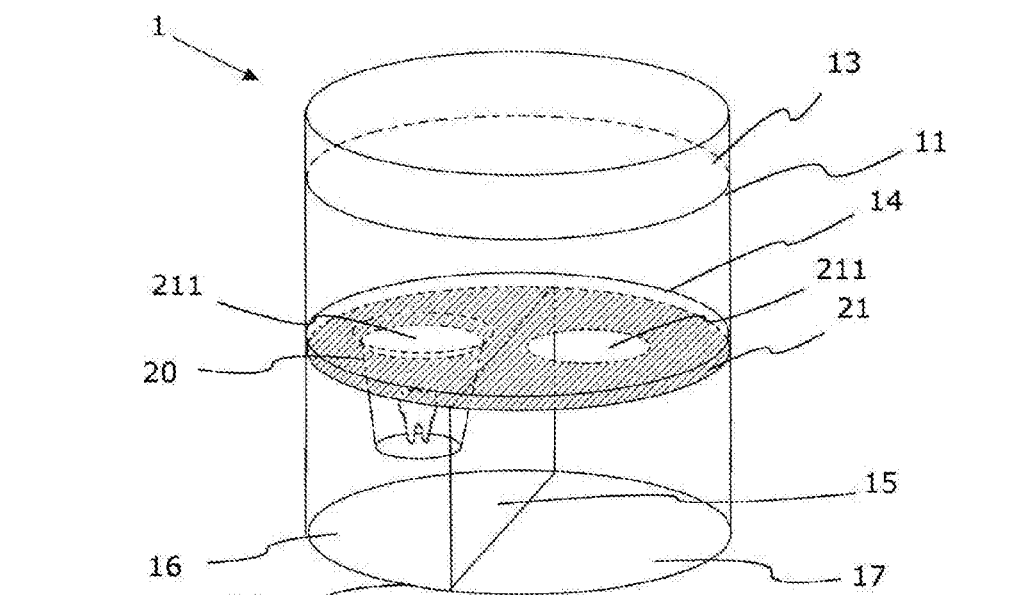
Figure 1
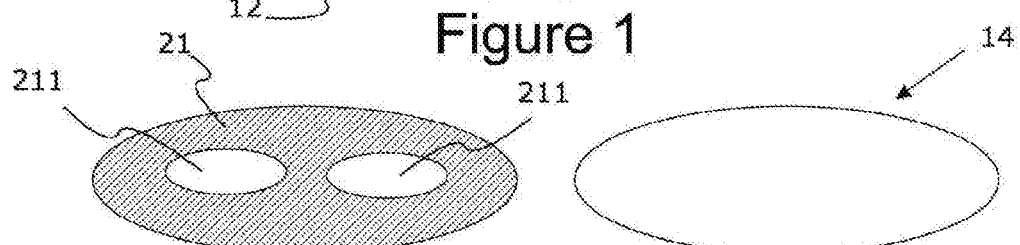
Figure 2a
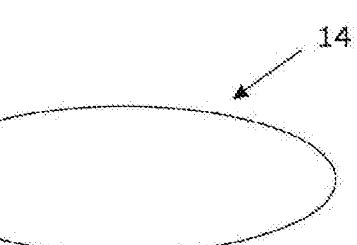
Figure 2c
Figure 2b
Figure 2d

DENTAL STORAGE BOX

CROSS REFERENCE TO RELATED APPLICATIONS

This application is a filing under 35 U.S.C. 371 of International Application No. PCT/TR2017/050305 filed Jul. 4, 2017, entitled "A Dental Storage Box" which claims priority to Turkish Patent Application No. 2016/20077 filed Dec. 29, 2016, which applications are incorporated by reference herein in their entirety.

TECHNICAL FIELD

The present invention relates to a dental storage box wherein an avulsed tooth is stored until the tooth is fixed back to the tooth socket for recovery, in other words, until the tooth is replanted.

PRIOR ART

Teeth may remove from the tooth socket. In case of avulsion where PDL (periodontal ligament) is completely broken, the vitality of the PDL cells is very important in terms of vitality of the tooth and prognosis of the tooth. Among the traumas related to mouth-tooth-jaw regions, avulsion (ex-articulation, total luxation), known as complete removal of the tooth from the socket thereof, is faced with a frequency of 1-16% in all of the traumas of the face region. As a result of these traumas, the front cutting teeth are affected with a frequency of 83.7%. When the tooth is completely removed from the socket, deterioration and damage begin in the pulp cells and in the structure of PDL. Therefore, the treatment prognosis of the avulsed tooth and duration of vitality of the tooth inside the mouth are closely related to the duration passed after trauma and the storage medium wherein the tooth is provided within this duration, and thus, closely related to the condition of PDL. As the tooth is completely removed outside of the socket, neuro-vascular support is interrupted and necrosis may result. After the trauma, the access duration to the doctor/clinic and the storage medium of the tooth cannot be in ideal conditions and urgent re-plantation option cannot be applied. In the period prior to re-plantation, in case the duration passing after the tooth is avulsed and in case the storage conditions are not suitable, the damaged PDL cells lead to inflammation resorption, and this inflammatory duration leads to root resorption, and as a result of this, the tooth is lost.

Moreover, the avulsed tooth shall be kept after being cleaned. The debris, existing on the tooth, affects the lifetime of the tooth and makes the re-plantation difficult.

As a result, because of all of the abovementioned problems, an improvement is required in the related technical field.

BRIEF DESCRIPTION OF THE INVENTION

The present invention relates to a dental storage box, for eliminating the above mentioned disadvantages and for bringing new advantages to the related technical field.

The main object of the present invention is to provide a dental storage box which stores an avulsed tooth after cleaning the tooth such that said tooth stays vital for a specific duration.

In order to realize all of the abovementioned objects and the objects which are to be deducted from the detailed description below, the present invention is a dental storage box comprising a 3-dimensional hollow body whose at least one surface is open and at least one outer cover which closes the open surface of said body in a manner providing sealing, in order to preserve a tooth, removed from the place thereof as a result of a trauma, for at least partially increasing the vitality duration of the tooth thanks to a protective liquid provided therein. Accordingly, the subject matter dental storage box comprises at least one separator provided inside the body and which separates the protective liquid and at least one cleaning liquid in a manner providing sealing. Thus, the chamber is separated into two compartments and more than one type of liquid can be placed.

In a preferred embodiment of the invention, a carrier which permits liquid is provided in order to provide the tooth, placed into said carrier, to be immersed into at least one of the protective liquid and the cleaning liquid. Thus, the tooth can be placed inside the carrier and it can be immersed into and removed from the liquids without hand contact.

In another preferred embodiment of the invention, said carrier is in the form of a beaker whose body is perforated.

In another preferred embodiment of the invention, at least one holder is provided which is connected to said separator and having at least one each openings for the placement of the carrier in the alignment of at least one first compartment and at least one second compartment formed by the separator inside the vessel.

In another preferred embodiment of the invention, at least one inner cover is provided which is connected to the holder in order to prevent liquid passage between the first compartment and the second compartment in a compliant manner to said holder. Thus, liquid passage between the two compartments and mixing of the liquids are prevented.

In another preferred embodiment of the invention, said inner covers are fixable such that no liquid passage occurs between the openings and in a compliant size with said openings.

BRIEF DESCRIPTION OF THE FIGURES

In FIG. 1, a general view of the dental storage box is given.

In FIG. 2a, a representative view of the holder is given.

In FIG. 2b, a representative view of the carrier is given.

In FIG. 2c, a representative view of the inner cover is given.

In FIG. 2d, a representative view of an alternative inner cover is given.

REFERENCE NUMBERS

Figure 3:
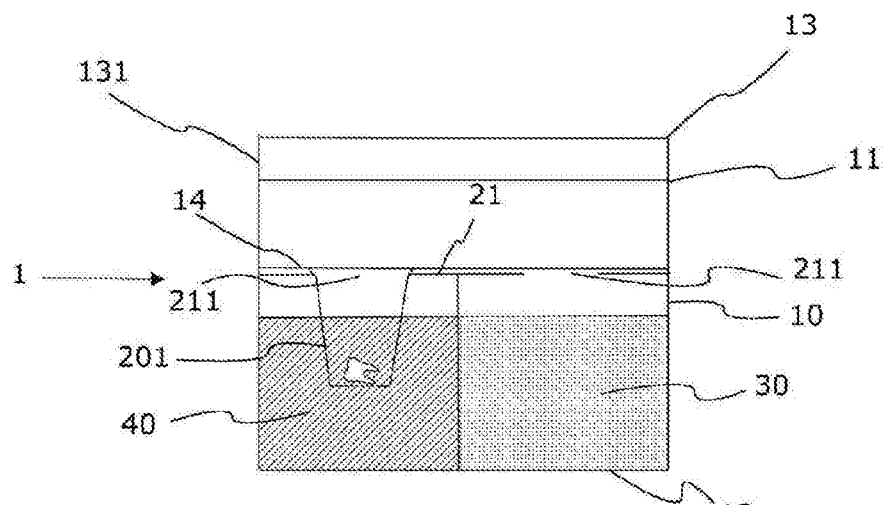
In FIG. 3, a representative view of a cross section of the dental storage box is given.
Figure 4:
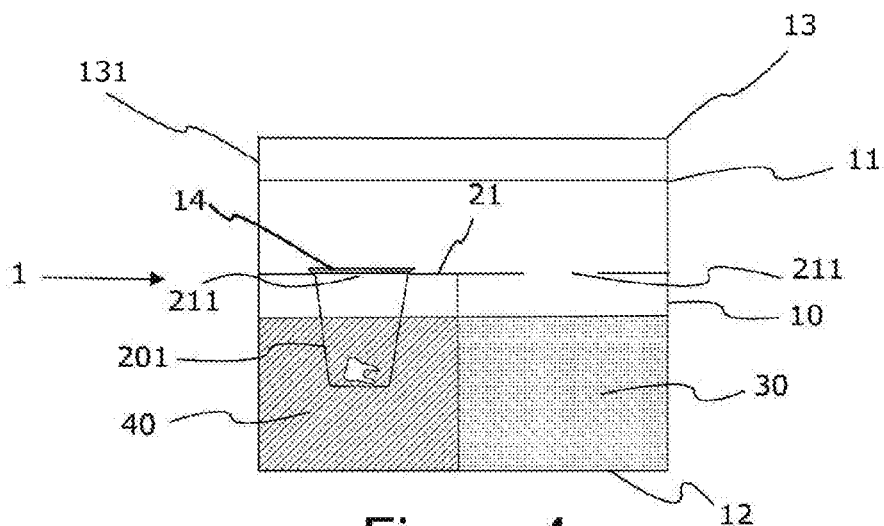
In FIG. 4, a representative view of a cross section of an alternative embodiment of the dental storage box is given.

1. Dental storage box
10 Body
11 Inlet
12 Base
13 Outer cover
  131 Holding wall
14 Inner cover
  14a. First inner cover
  14b. Second inner cover
  141 Threaded part
15 Separator
16 First compartment
17 Second compartment 20 Carrier
  201 Carrier body
  202 Holding protrusions
21 Holder
  211 Opening
30 Protective liquid
40 Cleaning liquid

DETAILED DESCRIPTION OF THE INVENTION

In this detailed description, the subject matter dental storage box (1) is explained with references to examples without forming any restrictive effect only in order to make the subject more understandable.

The dental storage box (1) in general comprises a three-dimensional hollow body (10) of which at least one surface is open and at least one outer cover (13) provided so as to close the open surface of said body (10).

Said body (10) has a form accommodating liquid therein. The body (10) is made of a leak-proof material. In the preferred embodiment, the body (10) is in the form of a hollow prism whose body (10) base (12) is closed. In the preferred embodiment, the body (10) is an orthogonal prism whose body (10) base (12) is closed and where the surface of the base (12) which is on the opposite side with respect to the center of the body (10) is open. The open surface provided on the opposite side of the base (12) is defined as an inlet (11). In the preferred embodiment, the outer surface of said inlet (11) has a partially threaded form. An outer cover (13) is provided in order to close the inlet (11). In the preferred embodiment, said outer cover (13) is circular and it has a form which is compliant to the form of the body (10).

At least one holding wall (131) is provided which extends orthogonally to the plane of the cover from the edges of the outer cover (13). In the preferred embodiment, the holding wall (131) has a form which may completely encircle the outer cover (13). In other words, the holding wall (131) is in the form of a ring which is compliant to the outer cover (13) and which is connected in a manner providing sealing. In the preferred embodiment, the outer surface of the holding wall (131) has threads which are compliant to the threads provided around the inlet (11).

At least one separator (15) is provided which extends inside the body (10) and which extends from the base (12) towards the inlet (11). Said separator (15) is positioned in a manner separating the body (10) into at least two compartments. In the preferred embodiment, it is in the form of a separator plate. In the preferred embodiment, the separator (15) separates the body (10) into two compartments, namely, the first compartment (16) and the second compartment (17). The separator (15) is isolated such that there is no liquid passage along the separator (15) between the first compartment (16) and the second compartment (17).

A holder (21) is provided which is connected to the end of the separator (15) close to the inlet (11). Said holder (21) is provided in an orthogonal manner to the separator (15) and in a connected manner to the separator (15) so as to close the first compartment (15) and the second compartment (17). There are at least two openings (211) on said holder (21) such that one is in the alignment of the first compartment (16) and the other one is in the alignment of the second compartment (17).

At least one carrier (20) is provided in order to be placed on said opening (211). Said carrier (20) has a form which may comprise a tooth therein and which may permit partial liquid passage through the surfaces thereof. In the preferred embodiment, the carrier (20) is in the form of a beaker whose surfaces have openings (211). In an alternative embodiment, carrier (20) may have a cage form whose one surface can be closed and unclosed. In another alternative embodiment, the carrier (20) may be in the form of a funnel. The carrier (20) in the preferred embodiment comprises a carrier body (201) having surfaces having holes where the tooth is placed, and holding protrusions (202) which provide holding of the carrier (20) to the opening. Said holding protrusions (202) are provided outwardly in the periphery of the open surface of the carrier (20). When the carrier is passed through the opening (211), said holding protrusions (202) pass completely through the opening (211) and prevent falling into the first compartment (16) or into the second compartment (17).

There is an inner cover (14) placed on the holder (21) in order to close the openings (211) in case carrier (20) is placed to the openings (211) and thus, in order to prevent liquid passage outwardly from the opening (211). Said inner cover (14) has a dimension and form compliant to the holder (21). Said inner cover (14) is closed onto the holder (21) by providing sealing in a manner preventing possible liquid passage from the opening (211), existing in the alignment of the first compartment (16), to the opening existing in the alignment of the second compartment (17).

In an alternative embodiment, there are two inner covers (14), namely, a first inner cover (14a) and a second inner cover (14b). The first inner cover (14a) and the second inner cover (14b) are provided in a manner connected to the openings (211) provided on both the first compartment (16) and on the second compartment (17) and in a manner connected to the holding protrusions (202) of the carrier (20). Accordingly, there are threaded parts (141) provided at the edges of the first inner cover (14a) and the second inner cover (14b). By means of said threaded parts (141), the inlet of the openings (211) and of the carrier (20) is closed in a leak-proof manner.

The operation of the dental storage box (1), whose details are given above, is as follows:

A cleaning liquid is placed into the first compartment (16) or into the second compartment (17) of the dental storage box (1) whose details have been given. A protective liquid is placed to the other compartment. In the preferred embodiment, said cleaning liquid (40) is a liquid provided for purifying the debris on the tooth which is avulsed. The protective liquid is a liquid providing vitality to the tooth for a longer duration when compared with the duration where the tooth is exposed.

The avulsed tooth is placed to the carrier (20). Carrier (20) is placed to the opening of the compartment where cleaning liquid (40) is provided. Thus, the tooth contacts with liquid and when the tooth is desired to be removed, there is no need to contact the liquid by hand. The inner cover is closed onto the holder (21) and when required, the outer cover (13) is also closed. Thus, liquid passage between the first compartment (16) and the second compartment (17) is provided and partial isolation from the contaminating substances is provided. Meanwhile, there is no item which prevents taking of the tooth to the related location in order for said tooth to be replanted. After a predetermined duration, the outer cover (13) and the inner cover (14) are opened, the carrier (20) is removed from the compartment of the cleaning liquid (40) and it is placed to the opening of the compartment of the protective liquid (30). Thus, the vitality duration of the tooth is partially increased. Isolation is provided again by closing the inner cover (14) first of all, and by closing the outer cover (13) afterwards. Thus, the tooth can be protected and carried in this manner until the replant process is begun. When the tooth is desired to be replanted, first of all, the outer cover (13) is opened and afterwards, the inner cover (14) is opened, and the tooth, provided inside the carrier (20), can be accessed.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A dental storage box (1) comprising a 3-dimensional hollow body (10) whose at least one surface is open and at least one outer cover (13) which closes the open surface of said body (10) in a manner providing sealing, in order to preserve a tooth, removed from the place thereof as a result of a trauma, for at least partially increasing the vitality duration of the tooth thanks to a protective liquid (30) provided therein; characterized by comprising at least one separator (15) provided inside the body (10) which separates the protective liquid (30) and at least one cleaning liquid (40) in a manner providing sealing;

the dental storage box (1) further comprising a carrier (20) which permits liquid in order to provide the tooth, placed into said carrier (20), to be immersed into at least one of the protective liquid (30) and the cleaning liquid (40); wherein said carrier is in the form of a beaker whose body (201) is perforated;

the dental storage box (1) further comprising at least one holder (21) which is connected to said separator (15) and having openings (211) for the placement of the carrier (20) in the alignment of at least one first compartment (16) and at least one second compartment (17) formed by the separator (15) inside the vessel body (10);

the dental storage box (1) further comprising at least one inner cover (14) which is connected to the holder (21) in order to prevent liquid passage between the first compartment (16) and the second compartment (17) in a compliant manner to said holder (21);

wherein said at least one inner cover (14) is fixable such that no liquid passage occurs between the openings (211) and in a compliant size with said openings (211); and wherein said the at least one inner cover (14) comprises at least one threaded part (141) in order to provide connection of said openings (211) and said carrier (20) to holding protrusions (202).

* * * * *